United States Patent
Betzin et al.

(10) Patent No.: US 11,043,840 B2
(45) Date of Patent: Jun. 22, 2021

(54) ENERGY STORAGE APPARATUS

(71) Applicant: Siemens Aktiengesellschaft, München (DE)

(72) Inventors: Christopher Betzin, Forchheim (DE); Holger Wolfschmidt, Erlangen (DE); Barbara Schricker, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 40 days.

(21) Appl. No.: 16/484,747

(22) PCT Filed: Feb. 1, 2018

(86) PCT No.: PCT/EP2018/052555
§ 371 (c)(1),
(2) Date: Aug. 8, 2019

(87) PCT Pub. No.: WO2018/145998
PCT Pub. Date: Aug. 16, 2018

(65) Prior Publication Data
US 2020/0006983 A1  Jan. 2, 2020

(30) Foreign Application Priority Data
Feb. 10, 2017 (DE) .............. 10 2017 202 136.5

(51) Int. Cl.
| | |
|---|---|
| *G05B 13/02* | (2006.01) |
| *H02J 15/00* | (2006.01) |
| *H02J 7/00* | (2006.01) |

(52) U.S. Cl.
CPC ............ *H02J 15/00* (2013.01); *G05B 13/021* (2013.01); *H02J 7/0063* (2013.01)

(58) Field of Classification Search
CPC ........ G05B 13/021; H02J 3/003; H02J 15/00; H02J 3/28
See application file for complete search history.

(56) References Cited

U.S. PATENT DOCUMENTS

| | | | |
|---|---|---|---|
| 2013/0054044 A1* | 2/2013 | Shaffer | H02J 13/0079 700/297 |
| 2013/0197710 A1* | 8/2013 | Hansen | H02J 3/14 700/297 |

(Continued)

FOREIGN PATENT DOCUMENTS

| | | | |
|---|---|---|---|
| WO | 2016/150815 A1 | 9/2016 | ............. B60L 50/15 |
| WO | 2018/145998 A1 | 8/2018 | ............. H02J 15/00 |

OTHER PUBLICATIONS

International Search Report and Written Opinion, Application No. PCT/EP2018/052555, 17 pages, dated Jun. 1, 2018.

*Primary Examiner* — Jennifer L Norton
(74) *Attorney, Agent, or Firm* — Slayden Grubert Beard PLLC

(57) ABSTRACT

Various embodiments include an energy storage apparatus for providing electrical energy comprising: a meter for capturing an electrical load profile to be provided and operating state values of energy storage devices; a data memory for storing data relating to an assessment profile for a respective energy storage device, wherein the assessment profile represents effects of operating parameters on a respective criterion of a respective energy storage device; a processor for dividing the electrical load profile into partial load profiles and assigning them to a respective energy storage device optimized based at least in part on the respective criterion and the respective operating state values; and an open-loop controller for operating the energy storage devices selected by the processor to jointly provide electrical power for the electrical load profile.

10 Claims, 2 Drawing Sheets

(56) References Cited

U.S. PATENT DOCUMENTS

| | | | |
|---|---|---|---|
| 2014/0094983 A1* | 4/2014 | Dykeman | H02J 3/008 700/295 |
| 2014/0172182 A1* | 6/2014 | Subbotin | H02J 3/382 700/291 |
| 2016/0043581 A1* | 2/2016 | Ito | H02J 3/46 320/134 |
| 2016/0218511 A1 | 7/2016 | Li et al. | 700/287 |
| 2016/0334821 A1 | 11/2016 | Lee et al. | 700/22 |
| 2017/0063125 A1* | 3/2017 | Jezierski, Jr. | H02J 3/32 |
| 2018/0060772 A1* | 3/2018 | Koch | H02J 3/14 |

\* cited by examiner

ENERGY STORAGE APPARATUS

CROSS-REFERENCE TO RELATED APPLICATIONS

This application is a U.S. National Stage Application of International Application No. PCT/EP2018/052555 filed Feb. 1, 2018, which designates the United States of America, and claims priority to DE Application No. 10 2017 202 136.5 filed Feb. 10, 2017, the contents of which are hereby incorporated by reference in their entirety.

TECHNICAL FIELD

The present disclosure relates to energy storage. Various embodiments may include flexible open-loop control units for the optimized operation of hybrid stores.

BACKGROUND

The desire to store electrical energy and to use it at a later time is becoming increasingly important, not least as a result of the increasing indication of renewable forms of energy such as sun and wind. There have been a large and constantly increasing the number of solution approaches to storing energy in the meantime. These can be roughly divided into mechanical, physical, and chemical/electrochemical stores. Known examples are flywheels, pumped-storage power plants, and various rechargeable batteries. All of these described stores have very different technical properties and technology-specific advantages and disadvantages. Typical classification features for energy stores are the energy and power density, the typical discharge time, the temperature range in which the stores can be operated, the efficiency, the service life which can be expected under particular operating conditions and, not least, the investment costs based on the storage capacity.

SUMMARY

The teachings of the present disclosure describe systems and methods for simply, flexibly, and effectively optimize and use an electrical energy storage apparatus with regard to particular criteria, in particular with regard to service life, efficiency, energy density, power density, discharge time and costs. For example, some embodiments include an energy storage apparatus (1) for providing electrical energy, having: a measuring device (3) for capturing an electrical load profile to be provided and operating state values of energy storage devices (5); a data storage device (7) for storing data relating to at least one assessment profile (BP) for a respective energy storage device (5), which assessment profile represents effects of operating parameters on a respective criterion of a respective energy storage device; a computer device (9) for dividing the electrical load profile to be provided into partial load profiles and for assigning them to a respective best energy storage device with regard to the respective criterion taking into account its operating state values; and an open-loop control device (11) for controlling the energy storage devices (5) selected by means of the assignment to jointly provide electrical power for the electrical load profile.

In some embodiments, the energy storage devices are mechanical, physical and/or chemical, in particular electrochemical, energy storage devices.

In some embodiments, a respective representing assessment profile is generated in the form of a matrix or a three-dimensional graph.

In some embodiments, the computer device expands the assessment profiles in terms of number, scope and/or degree of detail using values captured by the measuring device.

In some embodiments, additional assessment profiles are stored in the data storage device.

In some embodiments, the criteria are service life, efficiency, energy density, power density, discharge time and/or costs.

In some embodiments, the operating state values are temperature, state of charge, humidity, pressure, radiation values, capacity and/or power.

In some embodiments, the respective ratios of a current power to the maximum power of a respective energy storage device to the ratio of the current power to the maximum power of the energy storage apparatus are different.

In some embodiments, the open-loop control device is designed as a closed-loop control device by means of an actual/desired comparison.

As another example, some embodiments include a method of using an energy storage apparatus to provide electrical energy, having the following steps: capturing (S1), by means of a measuring device, an electrical load profile to be provided and operating state values of energy storage devices; storing data (S2) relating to at least one assessment profile for a respective energy storage device, by means of a data storage device, which assessment profile represents effects of operating parameters on a respective criterion of a respective energy storage device; dividing (S3) the electrical load profile to be provided into partial load profiles and assigning (S4) them to a respective best energy storage device with respect to the respective criterion taking into account its operating state values by means of a computer device; and controlling (S5), by means of an open-loop control device, the energy storage devices selected by means of the assignment to jointly provide electrical power for the electrical load profile.

In some embodiments, the assessment profiles are expanded in terms of number, scope and/or degree of detail by means of the computer device using values captured by the measuring device.

In some embodiments, additional assessment profiles are stored in the data storage device.

In some embodiments, the open-loop control device carries out closed-loop control by means of an actual/desired comparison.

BRIEF DESCRIPTION OF THE DRAWINGS

The teachings herein are described in more detail on the basis of exemplary embodiments in conjunction with the figures, in which.

DETAILED DESCRIPTION

Figure 1:
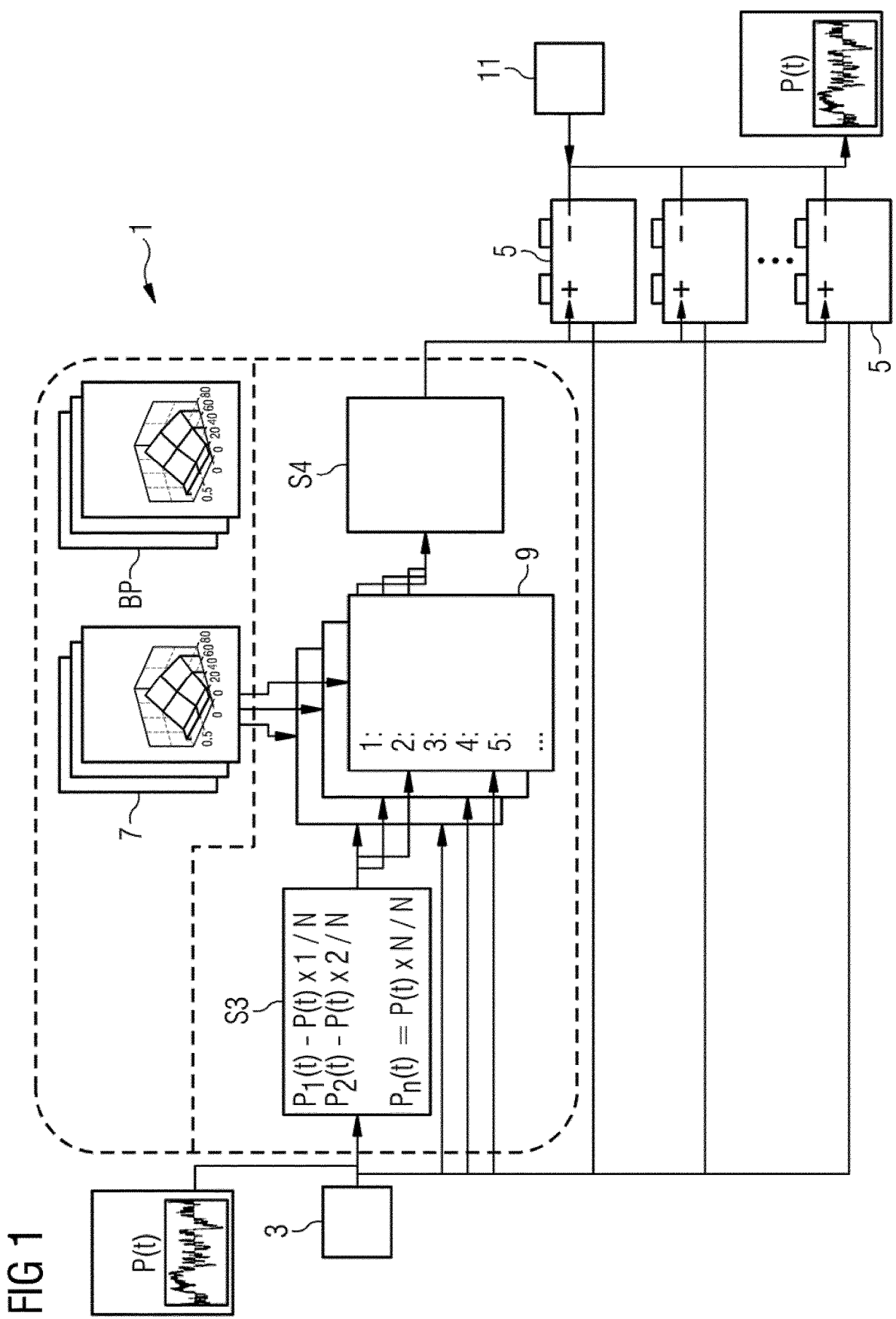
FIG. 1 shows an exemplary embodiment of an energy storage apparatus incorporating teachings of the present disclosure.

Some embodiments include an energy storage apparatus for providing electrical energy, having a measuring device for capturing an electrical load profile to be provided and operating state values of energy storage devices; a data storage device for storing data relating to at least one assessment profile for a respective energy storage device, which assessment profile represents effects of operating parameters on a respective criterion of a respective energy storage device; a computer device for dividing the electrical load profile to be provided into partial load profiles and for assigning them to a respective best energy storage device with regard to the respective criterion taking into account its operating state values; an open-loop control device for controlling the energy storage devices selected by means of the assignment to jointly provide electrical power for the electrical load profile.

Some embodiments include a method for operating an energy storage apparatus to provide electrical energy, having the following steps: capturing, by means of a measuring device, an electrical load profile to be provided and operating state values of energy storage devices; storing data relating to at least one assessment profile for a respective energy storage device, by means of a data storage device, which assessment profile represents effects of operating parameters on a respective criterion of a respective energy storage device; dividing the electrical load profile to be provided into partial load profiles and assigning them to a respective best energy storage device with respect to the respective criterion taking into account its operating state values by means of a computer device; controlling, by means of an open-loop control device, the energy storage devices selected by means of the assignment to jointly provide electrical power for the electrical load profile.

It has been recognized that not every energy store is equally well-suited to every application. There are often applications for which it is useful to combine different stores in order to combine advantages, eliminate disadvantages or simply to be able to actually cover special requirements. Solutions in which different types of stores are interconnected are referred to as hybrid stores. Technically, when combining different types of stores to form hybrid stores, the question arises of how the individual components should be controlled and how the respective required load profile should be usefully distributed among the individual stores.

A very great deal of potential is embedded in the management of hybrid stores. A division of the load profile into partial load profiles and their skilled assignment to the individual storage components can very greatly influence system properties such as efficiency, service life, predictability and, as a result, likewise investment costs and operating costs. Significant advantages can therefore be generated by means of optimized management.

For a clever operating strategy, a very large amount of detailed knowledge of the individual storage components is required. In addition, system properties of individual stores often change depending on their respective operating point, for example the state of charge and the power, and the prevailing operating conditions, for example the temperature. In the case of electrochemical stores for example, there are operating ranges which may have a particularly unfavorable effect on the service life of the stores and operating ranges in which the storage systems have reduced efficiency.

If unfavorable operating ranges of individuals storage components are successfully avoided in a targeted manner and can be covered by other storage components, considerable advantages can be generated for the entire system without having to restrict the overall functionality of the store.

The teaching of the present disclosure may be employed to provide some particular benefits. For example, the service life of the individual energy storage devices can be increased. The efficiency of the individual energy storage devices can be increased. The maintenance costs for the energy storage devices can be reduced. It is possible to save on peripherals, for example cooling components. The investment costs can likewise be reduced. The criterion according to which optimization is intended to be carried out can also be selected. New knowledge of the individual energy storage devices can be easily implemented by updating the assessment profiles. Active open-loop control of the entire system or of the energy storage apparatus is possible. Prediction accuracy can be increased and service life predictability can be improved by avoiding critical operating states.

In some embodiments, the energy storage devices may be mechanical, physical and/or chemical, in particular electrochemical, energy storage devices.

In some embodiments, respective representation of the assessment profile may be in the form of a matrix or a three-dimensional graph.

In some embodiments, the computer device can expand the assessment profiles in terms of number, scope and/or degree of detail using values captured by the measuring device.

In some embodiments, additional assessment profiles may be stored in the data storage device.

In some embodiments, the criteria may be service life, efficiency, energy density, power density, discharge time and/or costs.

In some embodiments, the operating state values of the energy storage devices may be temperature, state of charge, humidity, pressure, radiation values, capacity and/or power.

In some embodiments, the respective ratios of a current power to the maximum power of a respective energy storage device to the ratio of the current power to the maximum power of the energy storage apparatus may be different.

In some embodiments, the open-loop control device may be designed as a closed-loop control device by means of an actual/desired comparison.

FIG. 1 shows an exemplary embodiment of an energy storage apparatus 1 incorporating the teachings of the present disclosure. The present disclosure describes a concept for flexible open-loop control by means of an open-loop control device 11 for flexible open-loop control, which makes it possible to optimize the operation of hybrid energy storage devices 5 according to particular selectable aspects. Empirical values of the individual energy storage devices 5, which are collected as assessment profiles BP, are the basis for the optimization.

One example embodiment of an assessment profile BP is an assessment matrix. The required load profile P(t) is broken down into partial load profiles Pi(t) and is distributed among the individual energy storage devices 5 on the basis of the assessment matrices, the current operating states of the energy storage devices 5 and an optimization method. The optimization method may distribute the load profiles according to different adjustable criteria. In addition, the partial load profiles Pi(t) are compared with the overall load profile P(t). Deviations are therefore determined and can be counteracted. This may be carried out by means of a feedback path. The method of operation of the concept is illustrated in FIG. 1.

Input signals of a computer device 9 include the power P(t) required by the system and current status messages or operating state values of the individual energy storage devices 5. The computer device 9 now calculates different partial load profiles Pi(t) from the required load profile P(t). A check is then carried out for each of these partial load profiles Pi(t) in order to determine how well suited to complying with the respective partial load profile Pi(t) the individual energy storage devices 5 are. The analysis is carried out on the basis of the respective current operating state values of the individual energy storage devices 5, as captured by the measuring device 3, and the assessment matrix stored for the respective energy storage device 5 in a data storage device 7 as an exemplary embodiment of an assessment profile BP.

The optimization assigns the partial load profiles Pi(t) to the individual energy storage devices 5 in such a manner that the best possible result is achieved depending on the criterion which has been set.

It is possible to optimize operation according to any desired criteria. Examples of these are the service life, the costs based on the stored amount of energy or the efficiency. The corresponding assessment profiles BP or assessment matrices are stored in the data storage device 7 for the different aspects.

FIG. 1 shows a schematic illustration of an energy storage apparatus 1 with an incoming load profile P(t), subsequent assessment algorithms and subsequent profile allocation for each individual type of energy storage device 5. There is additionally a feedback loop which compares partial load profiles Pi(t) with complete load profiles P(t) in order to identify deviations and counteract them. The measuring device 3, the data storage device 7, the computer device 9 and the open-loop control device 11 can be combined as an open-loop control unit with flexible optimization.

In some embodiments, energy storage apparatus 1 can be in the form of management of a hybrid store, consisting of different electrochemical stores, which is optimized with respect to a long service life. In some embodiments, an energy storage apparatus 1 can be in the form of management of a hybrid store, consisting of electrochemical stores and non-electrochemical stores, which is optimized with respect to a long service life. Management of a hybrid store consisting of electrochemical stores and non-electrochemical stores can be optimized with respect to costs, for example costs per kilowatt hour of stored energy. Management of a hybrid store consisting of different electrochemical stores may be optimized with respect to the efficiency, for example. Management of a hybrid store consisting of electrochemical stores and non-electrochemical stores can be optimized with respect to the efficiency. A possibility for predicting favorable times for maintenance cycles arises with the aid of partial load profile assessments.

In some embodiments, the following hardware features can indicate that an energy storage apparatus 1 has been used for the open-loop control of a hybrid store or of a system of different energy storage devices 5: two or more different types of energy storage device 5 are controlled via a common open-loop control unit. The load profile of the hybrid store is typically composed of a plurality of partial load profiles which differ from one another.

$$P(t) = \sum_{i=1}^{N} P_i(t)$$

$$P_1(t) \neq P_2(t) \neq \ldots \neq P_N(t)$$

The ratio of power to maximum power of the individual energy storage devices 5 to that of the entire store is different.

$$\frac{P(t)}{P_{max}} \neq \frac{P_i(t)}{P_{i,max}}$$

The open-loop control unit contains a module for storing data.

Figure 2:
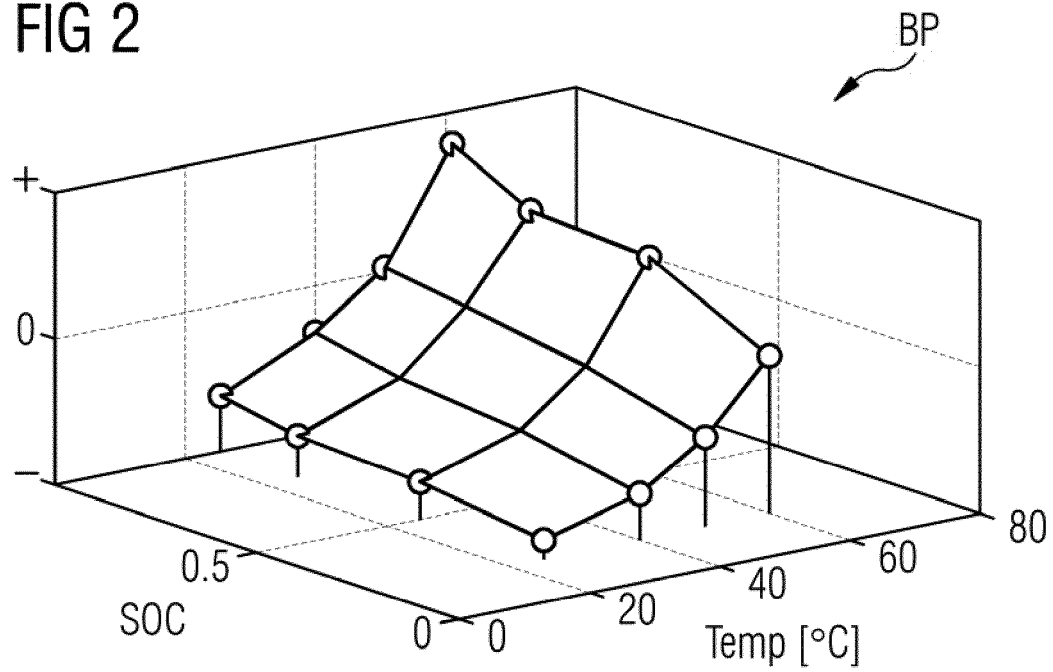
FIG. 2 shows an exemplary embodiment of an assessment profile incorporating teachings of the present disclosure.

FIG. 2 shows an exemplary embodiment of an assessment profile BP incorporating teachings of the present disclosure. In some embodiments, associated assessment matrices with respective parameters may be stored in a data storage device 7 for each individual energy storage device 5 and each adjustable optimization criterion. The parameters may be the state of charge SOC and the temperature T, for example. These are determined from measurement data by means of a measuring device 3 and can be continuously adapted during operation. On account of optimized management, a more accurate age estimate and therefore a more accurate prediction are possible with the aid of the assessment matrices.

The assessment matrices contain information relating to how particular operating points affect particular criteria. There is an associated assessment matrix for each energy storage device 5 and each criterion. The number, scope and degree of detail of the assessment matrices can be expanded with an increasing level of knowledge. Further assessment matrices can likewise be added in a simple manner.

FIG. 2 shows an example of an assessment matrix. In this case, measured calendar ageing of a lithium ion store is represented on the basis of the state of charge SOC and the temperature T. FIG. 2 therefore shows, as an example of a described assessment matrix, the influence of the state of charge SOC and the temperature T on the calendar ageing of an electrochemical energy store as an exemplary embodiment of an energy storage device 5, based on individual lithium ion cells of a particular cell chemistry. In the example illustrated, the greatest ageing takes place in a fully charged store in the upper temperature range. The ageing of the storage component or of the energy storage device 5 can be reduced in a targeted manner by avoiding this operating range.

Figure 3:
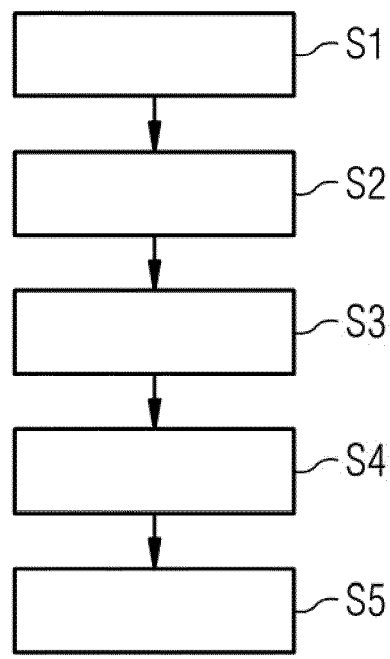
FIG. 3 shows an exemplary embodiment of a use incorporating teachings of the present disclosure.

FIG. 3 shows an exemplary embodiment of a method for use of an energy storage apparatus incorporating teachings of the present disclosure. An electrical load profile to be provided and operating state values of energy storage devices are captured S1 by means of a measuring device. A second step S2 is used to store data relating to at least one assessment profile for a respective energy storage device, which assessment profile represents effects of operating parameters on a respective criterion of a respective energy storage device.

A third step S3 is used to divide the electrical load profile to be provided into partial load profiles. A fourth step S4 is used to assign a respective partial load profile to a respective best energy storage device with regard to the required criterion taking into account the operating state value(s) of the affected energy storage device. A fifth step S5 is used to control the energy storage devices selected by means of the assignment S4 to jointly provide electrical power for the required electrical load profile.

What is claimed is:

1. An apparatus for storing and providing electrical energy, the apparatus comprising:
a meter for capturing an electrical load profile and respective operating state values for each of a plurality of energy storage devices;

a data memory for storing data relating to a respective assessment profile for each of the plurality of energy storage devices, wherein each assessment profile represents effects of operating parameters on respective criteria for each of the plurality of energy storage devices;

a processor for dividing the electrical load profile into a plurality of partial load profiles and assigning one partial load profile of the plurality of partial load profiles to each of the plurality of energy storage devices, wherein the plurality of partial load profiles are assigned based on the respective assessment profile of each of the plurality of energy storage devices; and a controller operating each of the plurality of energy storage devices using the assigned partial load profiles to jointly provide electrical power according to the electrical load profile.

2. The energy storage apparatus as claimed in claim 1, wherein each energy storage device of the plurality of energy storage devices comprises a mechanical, physical and/or chemical energy storage device.

3. The energy storage apparatus as claimed in claim 1, wherein each respective assessment profile comprises a matrix or a three-dimensional graph.

4. The energy storage apparatus as claimed in claim 1, wherein the processor expands each of the respective assessment profiles in terms of number, scope, and/or degree of detail using values captured by the meter.

5. The energy storage apparatus as claimed in claim 1, wherein additional assessment profiles are stored in the data memory.

6. The energy storage apparatus as claimed in claim 1, wherein the respective criteria includes one or more factors selected from a group consisting of: service life, efficiency, energy density, power density, discharge time, and costs.

7. The energy storage apparatus as claimed in claim 1, wherein the respective operating state values include one or more factors selected from a group consisting of: temperature, state of charge, humidity, pressure, radiation values, capacity, and power.

8. A method for using an energy storage apparatus to provide electrical energy, the method comprising:

capturing an electrical load profile and respective operating state values for each of a plurality of energy storage devices with a meter;

storing data relating to a respective assessment profile for each of the plurality of energy storage devices in a memory, wherein each respective assessment profile represents effects of respective operating parameters on respective criteria for each of the plurality of energy storage devices;

dividing the electrical load profile into a plurality of partial load profiles and assigning one partial load profile of the plurality of partial load profiles to each of the plurality of energy storage devices based on the respective assessment profile of each of the plurality of energy storage devices with a processor; and controlling each of the plurality of energy storage devices using the assigned partial load profiles to jointly provide electrical power according to the electrical load profile.

9. The method as claimed in claim 8, wherein at least one assessment profile of the assessment profiles is expanded in terms of number, scope, and/or degree of detail by the processor using values captured by the meter.

10. The method as claimed in claim 8, further comprising storing additional assessment profiles in the memory.

* * * * *